Patented Sept. 13, 1932

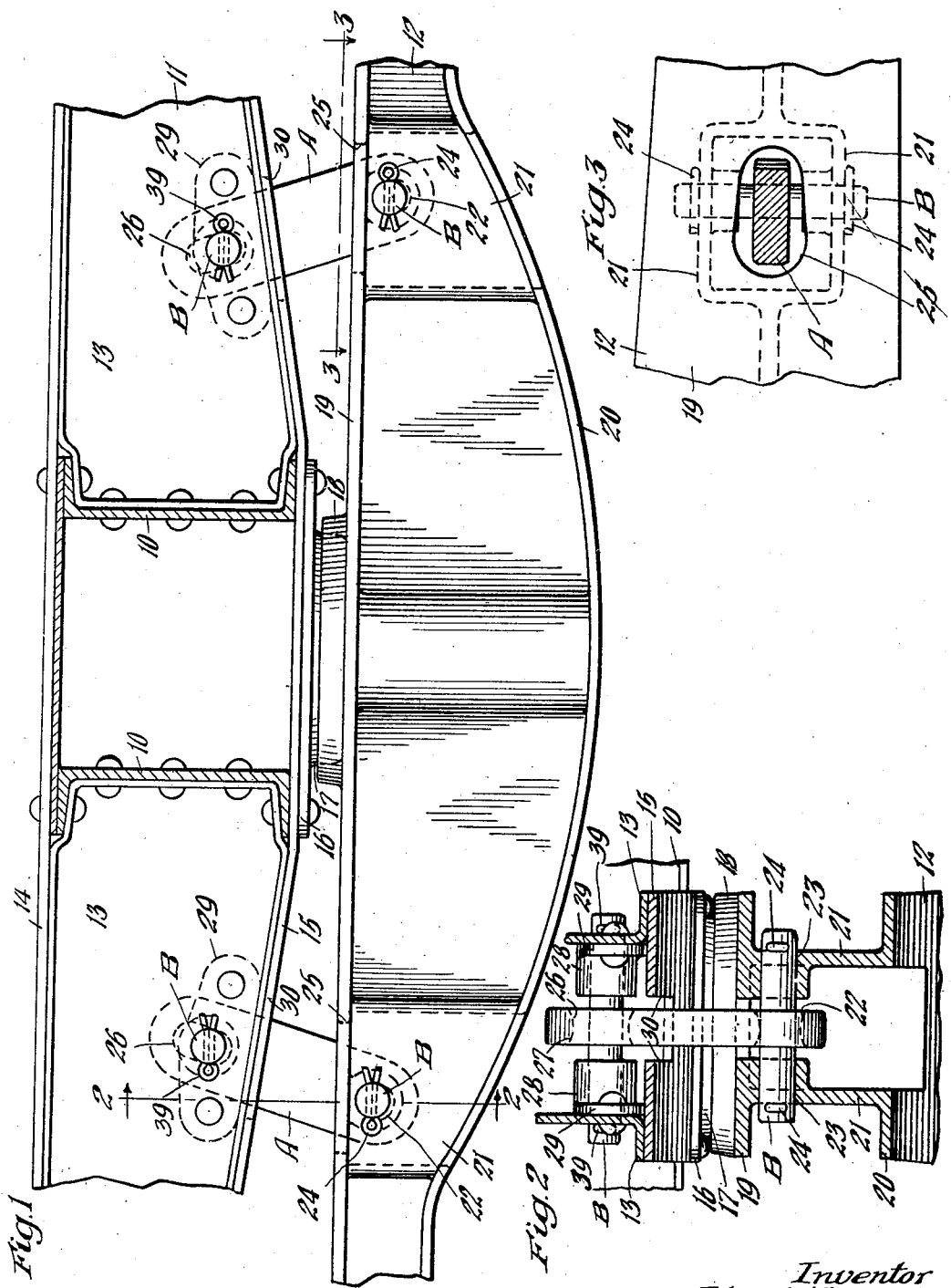

1,877,029

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CAR CONSTRUCTION

Application filed November 26, 1930. Serial No. 498,238.

This invention relates to improvements in car construction.

In the operation of railway cars, experience has shown the advisability of connecting the body and truck bolsters in such a manner as to prevent their vertical separation in the event of collision or derailment and thereby minimize the danger of turning over or telescoping of the cars. In an effort to accomplish this result, it has been the general practice to provide a locking center pin connecting the body and truck bolsters. While rugged locking means of this type may be effective in preventing separation of the bolsters, the danger of damage to the equipment is ever present in case of derailment in that the end of the car is free to swing at right angles into ditches or over trestles, due to the fact that the truck is free to rotate to various angular positions about the center bearing.

One object of the invention is to overcome the defects pointed out by preventing excessive relative rotation of the body and truck bolsters of the car in addition to limiting vertical separation thereof, in the event of derailment, through means for anchoring the bolsters to each other and restricting the amount of relative rotation of the body and truck bolsters of a car to an amount not greater than required in the operation of the car on track of maximum curvature encountered in standard railway practice.

Another object of the invention is to provide means connecting and locking together the body and truck bolsters of a railway car and in addition limiting the relative rotation of the bolsters.

A further object of the invention is to provide simple and efficient means for locking the bolsters of a railway car together, which means at the same time functions as a side bearing and in addition restricts the relative rotation of the bolsters.

A still further object of the invention is to provide means of the character specified in the preceding paragraph, wherein link members are provided at opposite sides of the car, for connecting the body and truck bolsters, to restrict relative rotation thereof and also prevent excessive vertical separation, and the link members cooperating with bearing elements on the bolsters to take the load in the manner of side bearing means when said bolsters approach each other.

A more specific object of the invention is to provide a pair of link members at opposite sides of the center bearing of a railway car, locking the body and truck bolsters together to prevent vertical separation, wherein the links are anchored to the bolsters by means of pins extending through openings in the opposite ends of each link and fixed to the respective bolsters, at least one of the pins of each link having a lost motion connection therewith permitting restricted relative rotation of the bolsters, the pins also having rocking bearing engagement with the links upon relative approach and rotation of the bolsters, thereby providing side bearing means.

In the drawing, forming a part of this specification, Figure 1 is a transverse, vertical, sectional view through the underframe structure of a railway car, showing the body and truck bolsters in elevation, and illustrating my improvements in connection therewith, the body and truck bolsters being partly broken away. Figure 2 is a vertical, sectional view, corresponding substantially to the line 2—2 of Figure 1. And Figure 3 is a horizontal, sectional view corresponding substantially to the line 3—3 of Figure 1.

In said drawing, 10—10 indicate the center or draft sills of a railway car, 11 the truck bolster and 12 the body bolster. The body bolster is of the built up type, including diaphragm side plates 13—13 of well known design, and the usual top plate 14 and bottom plate 15 fixed to the diaphragm side plates and the flanges of the center sills 10 in the usual manner. The body bolster is provided with a center bearing member 16 secured to the bottom face of the plate 15 and having a bearing projection 17 cooperating with a bearing member 18, formed on the truck bolster 12, the bearing member 18 having the usual pocket receiving the projection 17 of the body bolster bearing member. The truck bolster 12 is in the form of a casting having a top plate section 19, a bottom plate section 20, and connecting spaced, vertical web members 21—21.

In carrying out my invention, I provide broadly a pair of links A—A at opposite sides of the center bearing of the bolsters, connected to the respectve bolsters by pin members B—B.

Each link A is in the form of a flat bar-like member of substantially rectangular cross section, rounded at the top and bottom ends, as shown in Figures 1 and 2. Each link has a pin receiving opening 22 at the bottom end thereof, which is enlarged at opposite ends, as clearly illustrated in Figure 2, thereby providing interior walls forming convex bearing surfaces. The lower end of each link is secured to the corresponding bolster by means of the lower pin B, which extends through the opening 22 of the link and alined openings 23—23 in the vertical web members 21—21 of the truck bolster. As most clearly illustrated in Figures 2 and 3, the bearing openings 23—23 of the webs 21—21 of the bolster 12 are reinforced on the inner sides of the webs by thickening the same at that point. The pin B, associated with the lower end of the link A, may be fixed to the bolster 12 in any suitable manner, and as herein shown is held against endwise movement by cotter pins 24—24 extending through the opposite projecting ends thereof. The top plate 19 of the bolster 12, at each side thereof, is provided with an opening 25 of the shape illustrated in Figure 3, to accommodate the lower end portion of the corresponding link A. As will be seen upon reference to Figure 3, the opening 25 is of approximately oval form and is enlarged at the inner end thereof, the side walls of said opening diverging inwardly of the bolster. The opening 25 is of such a size as to permit lateral rocking of the link A on the pin B associated with the bolster 12. At the upper end, each link A is provided with an elongated pin-receiving opening or slot 26 adapted to accommodate the pin B of the body bolster. As clearly shown in Figures 1 and 2, the opening 26 has parallel side walls and curved end walls, the end walls being rounded to provide convex bearing surfaces 27—27 at the top and bottom ends of said opening. As will be evident, a laterally flaring opening is thus provided to permit rocking movement of the link A with respect to the corresponding pin B of the body bolster. The pin B, cooperating with the upper end of each link A extends through the opening 26 thereof and has the opposite ends thereof supported in brackets 28—28 secured to the inner sides of the vertical webs or diaphragm plates 13—13 of the body bolster 11. The brackets 28 are in the form of castings having laterally projecting ears or flanges 29—29, by which the same are secured to the plates 13—13. The brackets may be fixed by any well known securing means, rivets being herein illustrated, extending through the flanges of the brackets 28 and the vertical sections of the deformed plates 13—13. The outer ends of the pin B, associated with the upper end of the link A, extend through suitable openings provided in the webs or diaphragm plates 13—13 of the bolster 11 and the pin is locked against endwise movement by cotter pins 39—39 extending through the projecting outer ends thereof. The bottom plate 15 of the bolster 11, at opposite sides of the center bearing is provided with openings 30—30, through which the links A—A extend, the openings being of such a size as to permit both lateral rocking movement of the links A on the pins B at the upper ends thereof and swinging movement about the axis of each pin.

In the normal position of the parts, as shown in Figures 1 and 2, the bearing surface 27 at the lower end of the opening 26 of each link is spaced slightly from the corresponding pin B, thereby permitting relative approach of the bolsters when the car is operated on curved track. The bearing surface 27 at the upper end of the opening 26 of each link is also normally spaced from the corresponding pin B, the clearance provided between the pin and this bearing surface being greater than that provided between the pin and the lower bearing surface of the opening. As will be clear, there is thus provided a certain amount of lost motion between each link and the corresponding pin B of the body bolster. The amount of lost motion provided is such that the body and truck bolsters may rotate relatively to each other to a restricted extent. The amount of rotation permitted is preferably not greater than the necessary angular displacement of the body and truck bolsters about the center bearing when a car is operated on track of maximum curvature employed in standard railway practice. In the operation of my improved bolster locking means, when the car is operated on curved track, and body and truck bolsters approach each other at either side of the center bearing, the pin B of the body bolster at that side of the car will engage the bearing surface 27 at the lower end of the opening 26 of the corresponding link A, the link thereby taking the load and rocking on the pins B—B, the device functioning in the manner of a side bearing.

In case of derailment, the body and truck bolsters will be locked against complete separation by the links A—A, the links permitting relative vertical movement of the bolsters with respect to each other to the extent only of the clearance provided between the pins B—B of the body bolster and the bearing walls 27—27 at the upper ends of the openings 26—26 of the links. In the event of collision and derailment, the links A—A further prevent excessive relative angular displacement of the truck bolster with respect to the body bolster about the center bearing by restricting the rotation thereof, the bolsters being locked against further relative rotation when the pins B—B of the body bolster engage the outer end walls of the openings 26—26 at the upper ends of the links A—A. As will be evident, in addition to preventing complete separation of the body and truck bolsters, in the event of derailment, the links A—A so restrict the relative angular displacement of the body and truck bolsters about the center bearing as to minimize the danger of the truck assuming an angular position where the end of the car will swing at right angles and thereby be thrown into a ditch. It is further pointed out that free rotation of the truck of the car with respect to the body bolster is restricted so that it is impossible for the truck to assume a position at right angles to the normal position thereof, which condition frequently exists when a car leaves the track, thereby leaving the car free to swing laterally with resultant damage to the equipment.

I have herein shown and described what I now consider the preferred manner of carrying out my invention, but the same is merely illustrative and I contemplate all changes and modifications that come within the scope of the claims appended hereto.

I claim:

1. In car construction, the combination with body and truck bolsters having cooperating center bearing means thereon; of link members at opposite sides of said center bearing means anchored to said bolsters respectively to limit relative separation thereof in a vertical direction, each of said links having bearing openings at opposite ends thereof; and pins fixed to said bolsters and extending through said bearing openings respectively and having rocking bearing engagement with the walls of said openings to take the load upon relative approach of said bolsters during relative rotative movement thereof about said center bearing.

2. In car construction, the combination with body and truck bolsters having cooperating center bearing means thereon; of anchoring members at opposite sides of said center bearing means, each of said anchoring members having bearing openings at opposite ends thereof, at least one of said openings being elongated; and pins extending through said openings of the links and fixed to said bolsters respectively.

3. In car construction, the combination with body and truck bolsters having cooperating center bearing means thereon; of anchoring members at opposite sides of said center bearing means, each anchoring member having transverse, outwardly flaring bearing openings at opposite ends thereof; and pin members extending through said bearing openings and fixed to said body and truck bolsters respectively.

4. In car construction, the combination with body and truck bolsters having cooperating center bearing means thereon; of anchoring links at opposite sides of said center bearing means, each of said links having pin receiving openings at opposite ends thereof, one of said openings being elongated; and a pin extending through each opening of each link, said pins of each link being fixed respectively to the body and truck bolsters.

5. In car construction, the combination with body and truck bolsters having cooperating center bearing means thereon; of link members at opposite sides of said center bearing means, each link member having transverse, pin-receiving openings at opposite ends thereof, one of said openings being elongated to form a slot, each of said openings being flared outwardly at opposite sides of the link and presenting interior, convex bearing walls; and pins extending through said openings respectively, each of said pins being fixed to one of said bolsters.

In witness that I claim the foregoing I have hereunto subscribed my name this 24th day of November, 1930.

JOHN F. O'CONNOR.